(12) United States Patent
Nemirovsky et al.

(10) Patent No.: US 7,529,907 B2
(45) Date of Patent: May 5, 2009

(54) METHOD AND APPARATUS FOR IMPROVED COMPUTER LOAD AND STORE OPERATIONS

(75) Inventors: Mario D. Nemirovsky, Saratoga, CA (US); Stephen Melvin, San Francisco, CA (US); Enrique Musoll, San Jose, CA (US); Narendra Sankar, Campbell, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 39 days.

(21) Appl. No.: 11/876,442

(22) Filed: Oct. 22, 2007

(65) Prior Publication Data

US 2008/0040577 A1    Feb. 14, 2008

Related U.S. Application Data

(60) Division of application No. 09/629,805, filed on Jul. 31, 2000, and a continuation-in-part of application No. 09/312,302, filed on May 14, 1999, now Pat. No. 7,020,879, and a continuation-in-part of application No. 09/273,810, filed on Mar. 22, 1999, now Pat. No. 6,389,449, and a continuation-in-part of application No. 09/240,012, filed on Jan. 27, 1999, now Pat. No. 6,292,888, and a continuation-in-part of application No. 09/216,017, filed on Dec. 16, 1998, now Pat. No. 6,477,562.

(60) Provisional application No. 60/176,937, filed on Jan. 18, 2000.

(51) Int. Cl.
*G06F 9/312* (2006.01)
*G06F 9/305* (2006.01)

(52) U.S. Cl. .......................................... 712/5; 712/224

(58) Field of Classification Search ............... 712/5, 712/224
See application file for complete search history.

(56) References Cited

U.S. PATENT DOCUMENTS 4,197,579 A    4/1980    Forsman et al.

(Continued)

FOREIGN PATENT DOCUMENTS

EP    0764900 A2    9/1996

(Continued)

OTHER PUBLICATIONS

Grunewald et al. "Confidence Estimation for Speculation Control." Computer Architecture, 1998. Proceedings. The 25th Annual International Symposium on Barcelona, Spain. Jun. 27, 1998-Jul. 1, 1998. Los Alamitos, CA. USA IEEE Comput. Soc, US. pp. 122-131, XP010291387. ISBN: 0-8186-8491-7.

(Continued)

*Primary Examiner*—William M Treat
(74) *Attorney, Agent, or Firm*—Sterne Kessler Godstein & Fox P.L.L.C.

(57) ABSTRACT

Load and store operations in computer systems are extended to provide for Stream Load and Store and Masked Load and Store. In Stream operations a CPU executes a Stream instruction that indicates by appropriate arguments a first address in memory or a first register in a register file from whence to begin reading data entities, and a first address or register from whence to begin storing the entities, and a number of entities to be read and written. In Masked Load and Masked Store operations stored masks are used to indicate patterns relative to first addresses and registers for loading and storing. Bit-string vector methods are taught for masks.

12 Claims, 6 Drawing Sheets

U.S. PATENT DOCUMENTS

| | | | |
|---|---|---|---|
| 4,200,927 | A | 4/1980 | Hughes et al. |
| 5,142,676 | A | 8/1992 | Fried et al. |
| 5,309,173 | A | 5/1994 | Izzi et al. |
| 5,321,823 | A | 6/1994 | Grundmann et al. |
| 5,361,337 | A | 11/1994 | Okin |
| 5,390,307 | A | 2/1995 | Yoshida |
| 5,461,722 | A | 10/1995 | Goto |
| 5,511,210 | A | 4/1996 | Nishikawa et al. |
| 5,535,365 | A | 7/1996 | Barriuso et al. |
| 5,542,088 | A | 7/1996 | Jennings, Jr. et al. |
| 5,546,593 | A | 8/1996 | Kimura et al. |
| 5,561,776 | A | 10/1996 | Popescu et al. |
| 5,572,704 | A | 11/1996 | Bratt et al. |
| 5,600,837 | A | 2/1997 | Artieri |
| 5,604,877 | A | 2/1997 | Hoyt et al. |
| 5,632,025 | A | 5/1997 | Bratt et al. |
| 5,649,144 | A | 7/1997 | Gostin et al. |
| 5,694,572 | A | 12/1997 | Ryan |
| 5,701,432 | A | 12/1997 | Wong et al. |
| 5,713,038 | A | 1/1998 | Motomura |
| 5,745,778 | A | 4/1998 | Alfieri |
| 5,748,468 | A | 5/1998 | Notenboom et al. |
| 5,758,142 | A | 5/1998 | McFarling et al. |
| 5,784,613 | A | 7/1998 | Tamirsa |
| 5,812,811 | A | 9/1998 | Dubey et al. |
| 5,815,733 | A | 9/1998 | Anderson et al. |
| 5,852,726 | A | 12/1998 | Lin et al. |
| 5,860,017 | A | 1/1999 | Sharangpani et al. |
| 5,867,725 | A | 2/1999 | Fung et al. |
| 5,913,049 | A | 6/1999 | Shiell et al. |
| 5,913,054 | A | 6/1999 | Mallick et al. |
| 5,933,627 | A | 8/1999 | Parady |
| 5,946,711 | A | 8/1999 | Donnelly |
| 5,987,492 | A | 11/1999 | Yue |
| 6,016,542 | A | 1/2000 | Gottleib et al. |
| 6,018,759 | A | 1/2000 | Doing et al. |
| 6,029,228 | A | 2/2000 | Cai et al. |
| 6,052,708 | A | 4/2000 | Flynn et al. |
| 6,061,710 | A | 5/2000 | Eickemeyer et al. |
| 6,076,157 | A | 6/2000 | Borkenhagen et al. |
| 6,105,127 | A | 8/2000 | Kimura et al. |
| 6,115,802 | A | 9/2000 | Tock et al. |
| 6,119,203 | A | 9/2000 | Snyder et al. |
| 6,192,384 | B1 | 2/2001 | Dally et al. |
| 6,212,544 | B1 | 4/2001 | Borkenhagen et al. |
| 6,260,077 | B1 | 7/2001 | Rangarajan et al. |
| 6,308,261 | B1 | 10/2001 | Morris et al. |
| 6,356,996 | B1 | 3/2002 | Adams |
| 6,430,593 | B1 | 8/2002 | Lindsley |
| 6,442,675 | B1 | 8/2002 | Derrick et al. |
| 6,487,571 | B1 | 11/2002 | Voldman |
| 6,493,749 | B2 | 12/2002 | Paxhia et al. |
| 6,535,905 | B1 | 3/2003 | Kalafatis et al. |
| 7,020,879 | B1 | 3/2006 | Nemirovsky et al. |
| 7,035,997 | B1 | 4/2006 | Musoll et al. |
| 7,257,814 | B1 | 8/2007 | Melvin et al. |
| 2002/0062435 | A1 | 5/2002 | Nemirovsky et al. |
| 2003/0084269 | A1 | 5/2003 | Drysdale et al. |
| 2007/0143580 | A1 | 6/2007 | Musoll et al. |
| 2007/0294702 | A1 | 12/2007 | Melvin et al. |

FOREIGN PATENT DOCUMENTS

| | | | |
|---|---|---|---|
| EP | 0806730 | A2 | 11/1997 |
| EP | 0827071 | A2 | 3/1998 |
| EP | 0953903 | A2 | 11/1999 |
| GB | 2321984 | A | 6/1998 |
| JP | 2103630 | | 10/1988 |
| JP | 63254530 | | 10/1988 |
| JP | 4335431 | | 11/1992 |
| JP | 546379 | | 2/1993 |
| JP | 09506752 | A2 | 6/1997 |
| JP | 1011301 | A2 | 1/1998 |
| JP | 10124316 | A2 | 5/1998 |
| JP | 10207717 | A2 | 8/1998 |
| WO | WO9427216 | A1 | 11/1994 |
| WO | WO0023891 | A1 | 4/2000 |
| WO | WO0036487 | A2 | 6/2000 |

OTHER PUBLICATIONS

Oehring et al. "Simultaneous Multithreading and Multimeadia." Proceedings of the workshop on multithreaded execution, architecture and compilation. 1999, XP002462989. Orlando, FL, USA.

Kessler, R.E. et al. "The Alpha 21264 Microprocessor Architecture." Computer Design: VLSI In Computers and Processors, 1998. ICCD '98. Proceedings. International Conference on Austin, TX, USA Oct. 5-7, 1998. Los Alamitos, CA, USA, IEEE Comput. Soc, US. pp. 90-95. XP010310339. ISBN: 0-8186-9099-2.

Tullsen D.M. et al. "Exploiting Choice: Instruction Fetch and Issue on an Implementable Simultaneous Multithreading Processor." Institute of Electrical and Electronics Engineers Association for Computing Machinery. Proceedings of the 23rd Annual Symposium on Computer Architecture. Philadelphia. May 22-24, 1996. pp. 191-202. XP000679354. ISBN: 0-89791-786-3.

Jacobson et al. "Assigning Confidence to Conditional Branch Predictions." Proceedings of the 29th Annual IEEE/ACM International Symposium on Microarchitecture. Dec. 2-4, 1996. pp. 142-152. XP000724367. ISBN: 0-8186=7641-8.

Yoaz et al. "Speculation Techniques for Improving Load Related Instruction Scheduling," 1999, pp. 42-53, IEEE.

Donaldson et al. "DISC: Dynamic Instruction Stream Computer, An Evaluation of Performance." 26th Hawaii Conference on Systems Sciences. vol. 1. 1993. pp. 448-456.

Thekkath et al. The Effectiveness of Multiple Hardware Contexts. In Proceedings of the 6th International Conference on Architectural Support for Programming Languages and Operating Systems, pp. 328-337, San Jose, CA, Oct. 1994. ACM.

Nemirovsky, Mario D., "DISC: Dynamic Instruction Stream Computer," ACM, 1991, pp. 163-171.

McFarling, Scott. Combining Branch Predictors. WRL Technical Note TN-36. Jun. 1993. pp. 11-12. Digital Western Research Laboratory. Palo Alto, CA, US.

Ungerer et al. A Survey of Processors with Explicit Multithreading. ACM Computing Surveys, vol. 35, No. 1. Mar. 2003. pp. 29-63.

Kapps et al. "VAX Assembly Language and Architecture." Prindle, Weber & Schmidt. Boston, 1985. pp. 239-241.

Tanenbaum, Andrew S. "Structured Computer Organization." 2nd Edition, 1984, Prentice-Hall, pp. 10-12 and 204-221.

"Parallel Long Move Instruction." IBM Technical Disclosure Bulletin. IBM Corp, New York, US. vol. 33, No. 10A. Mar. 1, 1991. pp. 21-22. XP000109942 ISSN: 0018-8689.

Plant et al. "Data Length Calculation Hardware." IBM Technical Disclosure Bulletin, IBM Corp. New York, US. vol. 19, No. 1, Jun. 1, 1976. pp. 55-56. XP002333145. ISSN: 0018-8689.

Kessler, R.E., "The Alpha 21264 Microprocessor: Out-of-Order Execution at 600 Mhz", Aug. 1998, Compaq Computer Corporation, Shrewsbury, MA, USA.

Nemirovsky et al. Quantitative Study on Data Caches on a Multistreamed Architecture Proceedings of the MTEAC'98 (In conjunction with HPCA-4), Las Vegas, Nevada, Feb. 1998. http://citeseer.ist.psu.edu/nemirovsky98quantitative.html.

Li et al. Design and Implementation of a Multiple-Instruction-Stream Multiple-Execution-Pipeline Architecture. Seventh IASTED International Conference on Parallel and Distributed Computing and Systems, pp. 477-480, Oct. 1995.

Yamamoto, Wayne, "An Analysis of Multistreamed, Superscalar Processor Architectures," University of California Santa Barbara Dissertation. Dec. 1995. Santa Barbara, US.

Grunewald et al. "Towards Extremely Fast Context Switching in a Block Multithreaded Processor." Proceedings of EUROMICRO 22, 1996. pp. 592-599.

Bradford et al. "Efficient Synchronization for Multithreaded Processors." Workshop on Multithreaded Execution, Architecture, and Compilation. Jan.-Feb. 1998. pp. 1-4.

Tullsen et al. Supporting Fine-Grained Synchronization on a Simultaneous Multithreading Processor, USCD CSE Technical Report CS 98-587, Jun. 1998, all pages, US.

Fiske et al. Thread prioritization: A Thread Scheduling Mechanism for Multiple-Context Parallel Processors. Proceedings of the First IEEE Symposium on High-Performance Computer Architecture. Jan. 1995. pp. 210-221. Raleigh, NC, US.

Yamamoto et al. "Performance Estimation of Multistreamed, Superscalar Processors," 27nd Annual Hawaii International Conference on Systems Sciences, 1994, pp. 195-204, IEEE.

Nemirovsky, Mario D., "DISC: A Dynamic Instruction Stream Computer," 1990, UMI, Ann Arbor, MI.

Diefendorff, Keith, "Compaq Chooses SMT for Alpha," Dec. 6, 1999, Microprocessor Report.

Diefendorff, Keith, "WinChip 4 Thumbs Nose At ILP," Microprocessor Report, Dec. 7, 1998, vol. 12, No. 16.

Diefendorff, Keith, "Jalapeño Powers Cyrix's M3," Microprocessor Report, Nov. 16, 1998, vol. 12, No. 15.

Slater, Michael, "Rise Joins x86 Fray with mP6," Microprocessor Report, Nov. 16, 1998, vol. 12, No. 15.

Eggers et al., "Simultaneous Multithreading: A Platform for Next-Generation Processors," IEEE Micro, Sep./Oct. 1997.

Becker et al., "The PowerPC 601 Microprocessor," IEEE Micro, Oct. 1993.

Steere et al., "A Feedback-Driven Proportion Allocator for Real-Rate Scheduling," Proceedings of the Third Symposium on Operating Systems Design and Implementation, pp. 145-158, Feb. 1999., http://citeseer.ist.psu.edu/steere99feedbackdriven.html.

Cui et al., "Parallel Replacement Mechanism for MultiThread," Advances in Parallel and Distributed Computing, 1997. Proceedings, IEEE, Mar. 21, 1977, pp. 338-344.

Yamamoto et al. "Increasing Superscalar Performance Through Multistreaming." Parallel Architectures and Compilation Techniques (PACT '95). 1995.

Tullsen et al., "Simultaneous Multithreading: Maximizing on-chip parallelism," In Proceedings of the 22nd Annual International Symposium on Computer Architecture, pp. 392-403, Jun. 22-24, 1995. http://citeseer.csail.mit.edu/tullsen95simultaneous.html.

The PowerPC Architecture: A Specification for a New Family of RISC Processors. $2^{nd}$ Ed. May 1994. pp. 70-72. Morgan Kaufmann. San Francisco, US.

MC68020 32-Bit Microprocessor User's Manual, Third Edition, 1989, pp. 3-125, 3-126, and 3-127, Prentice Hall, New Jersey.

Potel, M.J., Real-Time Playback in Animation Systems, Proceedings of the 4th Annual Conference on Computer Graphics and Interactive Techniques, 1977, pp. 72-77, San Jose, CA.

ARM Architecture Reference Manual. 1996. pp. 3-41, 3-42, 3-43, 3-67, and 3-68. Prentice Hall, NJ, US.

ESA/390 Principles of Operation. IBM Online Publications Center Reference No. SA22-7201-08. Table of Contents and paras. 7.5.31 and 7.5.70. IBM Corporation. Boulder, CO, US.

MC88110 Second Generation RISC Microprocessor User's Manual. 1991. pp. 10-66, 10-67, and 10-71. Motorola, Inc.

Diefendorff, Keith et al. "Organization of the Motorola 88110 Superscalar RISC Microprocessor." IEEE Journal of Microelectronics. Apr. 1992. pp. 40-63. vol. 12, No. 2. IEEE. New York, NY, US.

Kane, Gerry. PA-RISC 2.0 Architecture. 1996, pp. 7-106 and 7-107. Prentice Hall. NJ, US.

Diefendorff et al. "AltiVec Extension to PowerPC Accelerates Media Processing." IEEE Journal of Microelectronics. vol. 20, No. 2 (2000): pp. 85-95.

Pai et al. "An Evaluation of Memory Consistency Models for Shared-Memory Systems with ILP Processors." Proceedings of ASPLOS-VII, Oct. 1996: pp. 12-23, ACM, Inc.

U.S. Appl. No. 09/629,805, filed Jul. 31, 2000, Nemirovsky et al.

US 7,178,007, 02/2007, Musoll et al. (withdrawn)

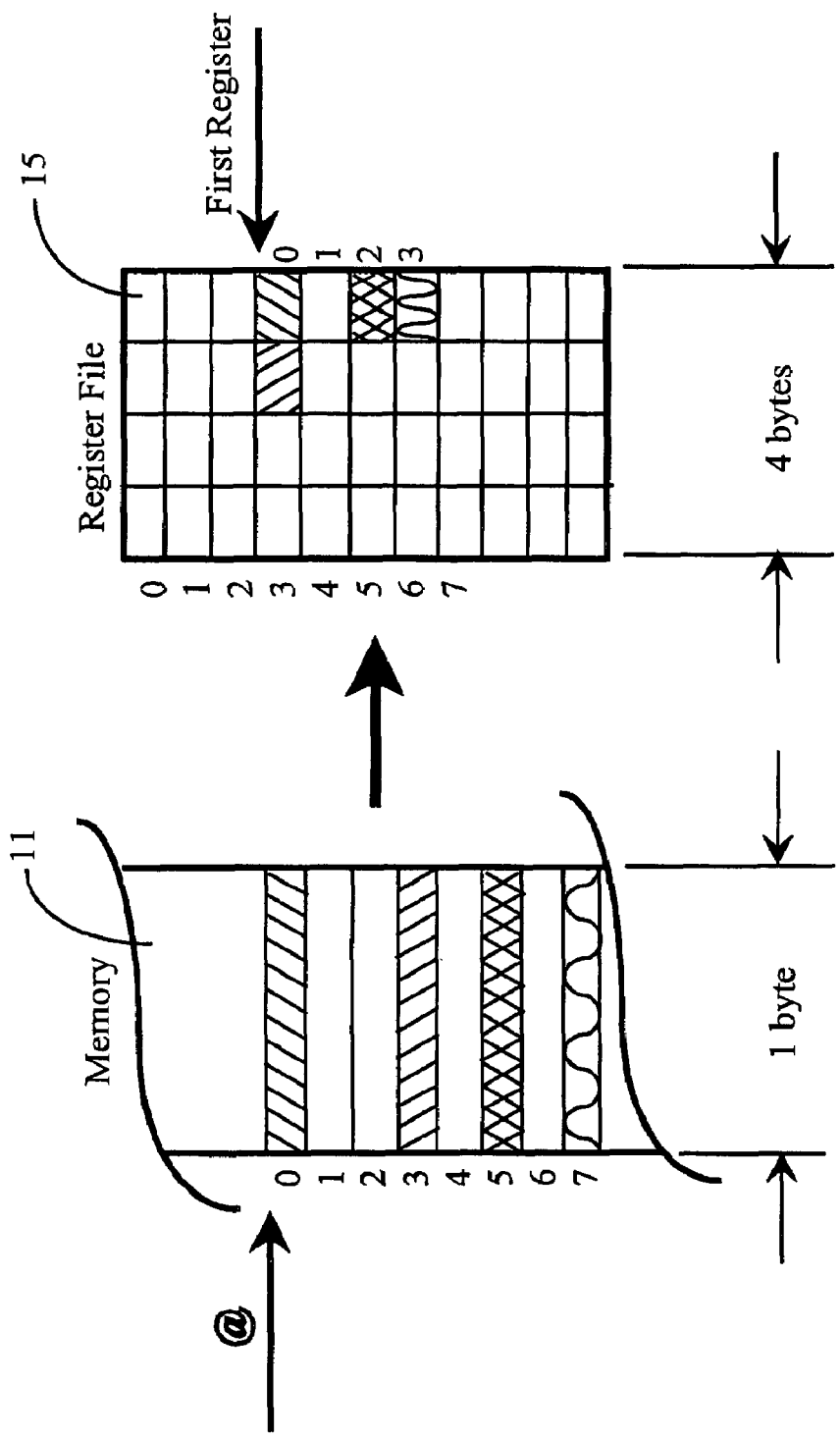

| Mem. Byte No. | Rel. Reg. No. |
|---|---|
| 0 | 0 |
| 3 | 0 |
| 5 | 2 |
| 7 | 3 |

Mask Example

METHOD AND APPARATUS FOR IMPROVED COMPUTER LOAD AND STORE OPERATIONS

CROSS-REFERENCE TO RELATED APPLICATIONS

This application is a divisional of U.S. patent application Ser. No. 09/629,805 entitled METHOD AND APPARATUS FOR IMPROVED COMPUTER LOAD AND STORE OPERATIONS, having a common assignee and common inventors, and filed on Jul. 31, 2000. That application claimed priority from provisional application Ser. No. 60/176,937. In addition, that application is a continuation-in-part of the following U.S. Pat. Nos. 6,477,562, 6,292,888, and 6,389,449, and 7,020,879.

FIELD OF THE INVENTION

The present invention is in the field of digital processing and pertains more particularly to apparatus and methods for loading and storing data entities in computer operations.

BACKGROUND OF THE INVENTION

The present invention is in the area of CPU operations in executing instructions from software. As is known in the art there are many kinds of instruction set architectures (ISA), and certain architectures have become favored in many computer operations. One of those architectures is the well-known MIPS ISA, and the MIPS ISA is used in the present specification in several examples. The invention, however, is not limited to MIPS ISA.

One of the necessary operations in computer processes when executing instructions is moving data entities between general-purpose or cache memory and register files in a CPU where the data is readily accessible. When more than one data entity must be loaded or stored before execution can commence or continue, several instructions are needed in a conventional instruction set architecture. In applications that need to access data the present inventors have discovered that it would be desirable to have a single instruction that could load or store data entities that are related in a known pattern, and that a single instruction capable of such operation would significantly improve the speed and efficiency of many computer operations.

What is therefore clearly needed is a method and apparatus comprising a single instruction for indicating data entities having a known positional relationship in memory, and for loading or storing a series of such data entities as a result of executing the single instruction.

SUMMARY OF THE INVENTION

In a preferred embodiment of the present invention, in computer operation, a method for selecting data entities from a memory and writing the data entities to a register file is provided, comprising steps of (a) selecting and reading N entities beginning at a first address; and (b) writing the entities to the register file from a first register in the order of the entities in the memory. In preferred embodiments the steps follow from a Stream Load instruction implemented according to an instruction set architecture (ISA), and the ISA may be MIPS. Also in a preferred embodiment arguments of the Stream Load instruction indicate a beginning memory address from which to read data entities, a first register in the register file at which to begin writing the data entities, and a number indicating the number of data entities to read and write.

In another aspect of the invention, in computer operation, a method for selecting data entities from a register file and writing the data entities to a memory is provided, comprising steps of (a) selecting and reading N entities beginning at a first register; and (b) writing the entities to the memory from a first address in the order of the entities in the register file. In preferred embodiments the steps follow from a Stream Store instruction implemented according to an instruction set architecture (ISA), and the ISA is MIPS. Also in preferred embodiments arguments of the Stream Store instruction indicate a beginning register from which to read data entities, an address in memory from which to write the data entities, and a number indicating the number of data entities to read and write.

In another aspect of the invention, in computer operations, a method for selecting data entities from a memory and writing the data entities to a register file is provided, comprising steps of (a) consulting a first map of entities to copy relative to a first address; (b) selecting and reading those entities indicated by the map; (c) consulting a second map of positions to write the entities copied from the memory, relative to a first register; and (d) writing the entities to the register file according to the second map. In preferred embodiments the steps follow from a Masked Load instruction implemented according to an instruction set architecture (ISA). Also in preferred embodiments the ISA is MIPS. Also in preferred embodiments arguments of the Masked Load instruction indicate a beginning memory address for positioning a mask, a mask number to be used, and a first register where to begin writing data entities in the register file. In some embodiments the first and second maps are implemented as bit strings, wherein the position of bits in the string indicate the positions for data entities to be selected from memory, and the registers to which data entities are to be written.

In yet another aspect of the invention a method for selecting data entities from a register file and writing the data entities to a memory is provided, comprising steps of (a) consulting a first map of entities to read relative to the first register; (b) selecting and reading those entities indicated by the map; (c) consulting a second map of positions to write the entities read from the register file, relative to the first address; and (d) writing the entities to the memory file according to the second map. In preferred embodiments the steps follow from a Masked Store instruction implemented according to an instruction set architecture (ISA), and the ISA may be MIPS. Also in preferred embodiments arguments of the Masked Store instruction indicate a beginning register for positioning a mask, a mask a number to be used, and a first register where to begin writing data entities in the memory. In some embodiments the first and second maps are implemented as bit strings, wherein the position of bits in the string indicate the positions for data entities to be read, and the registers to which data entities are to be written.

In yet another embodiment of the invention, for use in computer operations, a Stream Load instruction is provided comprising an indication of the instruction; a first argument indicating a first address in a memory from which to begin reading data entities; a second argument indicating a first register in a register file from which to write the data entities read from the memory; and a third argument indicating a number of data entities to be read and written.

In another aspect a Stream Store instruction is provided comprising an indication of the instruction; a first argument indicating a first address in a register file from which to begin reading data entities; a second argument indicating a first address in a memory beginning from which to write the data entities read from the register file; and a third argument indicating a number of data entities to be read and written.

In still another aspect a Masked Load instruction is provided comprising an indication of the instruction; a first argument indicating a first address in a memory at which to position a mask to indicate data entities to be read; a second argument indicating a first register in a register file beginning at which to write the data entities read from the memory; and a third argument indicating a mask number to be used to select the data entities to be read and written.

In still another aspect a Masked Store instruction is provided comprising an indication of the instruction; a first argument indicating a first register in a register file at which to position a mask to indicate data entities to be read; a second argument indicating a first address in a memory beginning at which to write the data entities read from the register file; and a third argument indicating a mask number to be used to select the data entities to be copied and written.

In another aspect a computing system is provided comprising a CPU; a memory; and a register file. The system is characterized in that the CPU, in loading data entities from the memory into the register file, reads a predetermined number of data entities, and writes the data entities into registers of the register file in the same order as in the memory, beginning at a predetermined first register. In preferred embodiments of the system the transferring of data entities from memory into the register file follow from a Stream Load instruction implemented according to an instruction set architecture (ISA) and executed by the CPU, and the ISA may be MIPS. In some embodiments arguments of the Stream Load instruction indicate a beginning memory address from which to read data entities, a first register in the register file from which to write the data entities, and a number indicating the number of data entities to read and write.

In yet another aspect a computing system is provided comprising a CPU; a memory; and a register file. The system is characterized in that the CPU, in storing data entities into the memory from the register file, reads a predetermined number of data entities from the register file, and writes the data entities into addressed locations in memory in the same order as in the register file, beginning at a predetermined first address. In preferred embodiments the storing of data entities from the register file into memory follows from a Stream Store instruction implemented according to an instruction set architecture (ISA) and executed by the CPU, and the ISA may be MIPS. Also in preferred embodiments arguments of the Stream Store instruction indicate a first register file from which to read data entities, a first address in memory to which to write the data entities, and a number indicating the number of data entities to read and write.

In another aspect a computing system is provided comprising a CPU; a memory; and a register file. This system is characterized in that the CPU, in storing data entities into the memory from the register file, reads a predetermined number of data entities from the register file, and writes the data entities into addressed locations in memory in the same order as in the register file, beginning at a predetermined first address. In preferred embodiments the storing of data entities from the register file into memory follows from a Stream Store instruction implemented according to an instruction set architecture (ISA) and executed by the CPU, and the ISA may be MIPS. In some embodiments arguments of the Stream Store instruction indicate a first register file from which to read data entities, a first address in memory to which to write the data entities, and a number indicating the number of data entities to read and write.

In another aspect a computing system is provided comprising a CPU; a memory; and a register file. The CPU, in loading data entities from the memory into the register file reads data entities according to a pre-determined pattern relative to a first address, and writes the data entities into registers of the register file in a pre-determined pattern relative to a first register. In preferred embodiments the loading of data entities from memory into the register file follows from a Masked Load instruction implemented according to an instruction set architecture (ISA) and executed by the CPU, and the ISA may be MIPS. In some embodiments arguments of the Masked Load instruction indicate a beginning memory address from which to read data entities, a first register in the register file beginning at which to write the data entities, and a Mask Number indicating a stored mask to be employed to indicate the relative positions in the memory and register file for reading a writing data entities. Further, the stored masks may be implemented as two bit-string vectors, a first vector indicating which data entities relative to the first address to read, and the second indicating into which registers relative to the first register to write the data entities.

In still another aspect a computing system is provided comprising a CPU; a memory; and a register file. In the system the CPU, in storing data entities into the memory from the register file reads data entities from the register file according to a pre-determined pattern, and writes the data entities into addressed locations in memory also according to a pre-determined pattern, beginning at a first address. In preferred embodiments the storing of data entities from the register file into memory follows from a Masked Store instruction implemented according to an instruction set architecture (ISA) and executed by the CPU, and the ISA may be MIPS. In preferred embodiments arguments of the Masked Load instruction indicate a beginning memory address from which to read data entities, a first register in the register file beginning at which to write the data entities, and a Mask Number indicating a stored mask to be employed to indicate the relative positions in the memory and register file for reading and writing the data entities. In some embodiments the stored masks are implemented as two bit-string vectors, a first vector indicating which data entities relative to the first register to read, and the second indicating into which registers relative to the first address to write the data entities.

In still another aspect a dynamic multistreaming (DMS) processor is provided, comprising a first plurality k of individual streams, and a second plurality m of masks or mask sets. Individual masks or masks sets of the second plurality m are dedicated to exclusive use of individual ones of the first plurality of k streams for performing Masked Load and/or Masked Store operations. In preferred embodiments individual masks or mask sets are amendable only by the stream to which the individual mask or mask sets are dedicated.

In still another aspect a dynamic multistreaming (DMS) processor system is provided, comprising a plurality k of individual streams, a set of masks or mask sets for use in performing Masked Load and Masked Store operations, wherein multiple data entities are loaded or stored as a result of executing a single instruction, and according to the masks, a cache memory, and a system memory. The system is characterized in that the system, in performing a Masked Load or a Masked Store operation transfers data entities directly between the system memory and one or more register files.

In embodiments of the invention taught in enabling detail below, for the first time methods and apparatus are provided for load and store operations in computer systems wherein multiple data entities may be read and written according to a single instruction, saving many cycles in execution, and data entities may be selected for reading and writing consecutively, or according to pre-stored position masks.

BRIEF DESCRIPTION OF THE DRAWINGS

FIG. 2A is a schematic diagram of a memory and a register file illustrating a Masked Load operation according to an embodiment of the present invention.

DESCRIPTION OF THE PREFERRED EMBODIMENTS

As was described briefly above, there exist in the technical field of computer operations a number of different instruction set architectures (ISA). An instruction set architecture, generally speaking, is the arrangement of bits and sets of bits in a binary word that a CPU interprets as an instruction. The well-known MIPS ISA is the architecture used by the present Inventors in implementing the present invention in a preferred embodiment, but the invention is certainly not limited to the MIPS ISA. For this reason the specific use of portions of an instruction word as known in MIPS architecture will not be described in detail herein. It is well-known that the MIPS architecture provides unused op-codes that can be used to implement new instructions, and the present inventors, in the MIPS preferred embodiment, have taken advantage of this feature.

Because the invention will apply to conceivably any ISA, the inventors will specify and describe the instructions that initiate new and non-obvious functions in the following manner:

Instruction A, B, C where A, B, and C are arguments defining parameters for functions to be performed in executing the instruction.

Figure 1A:
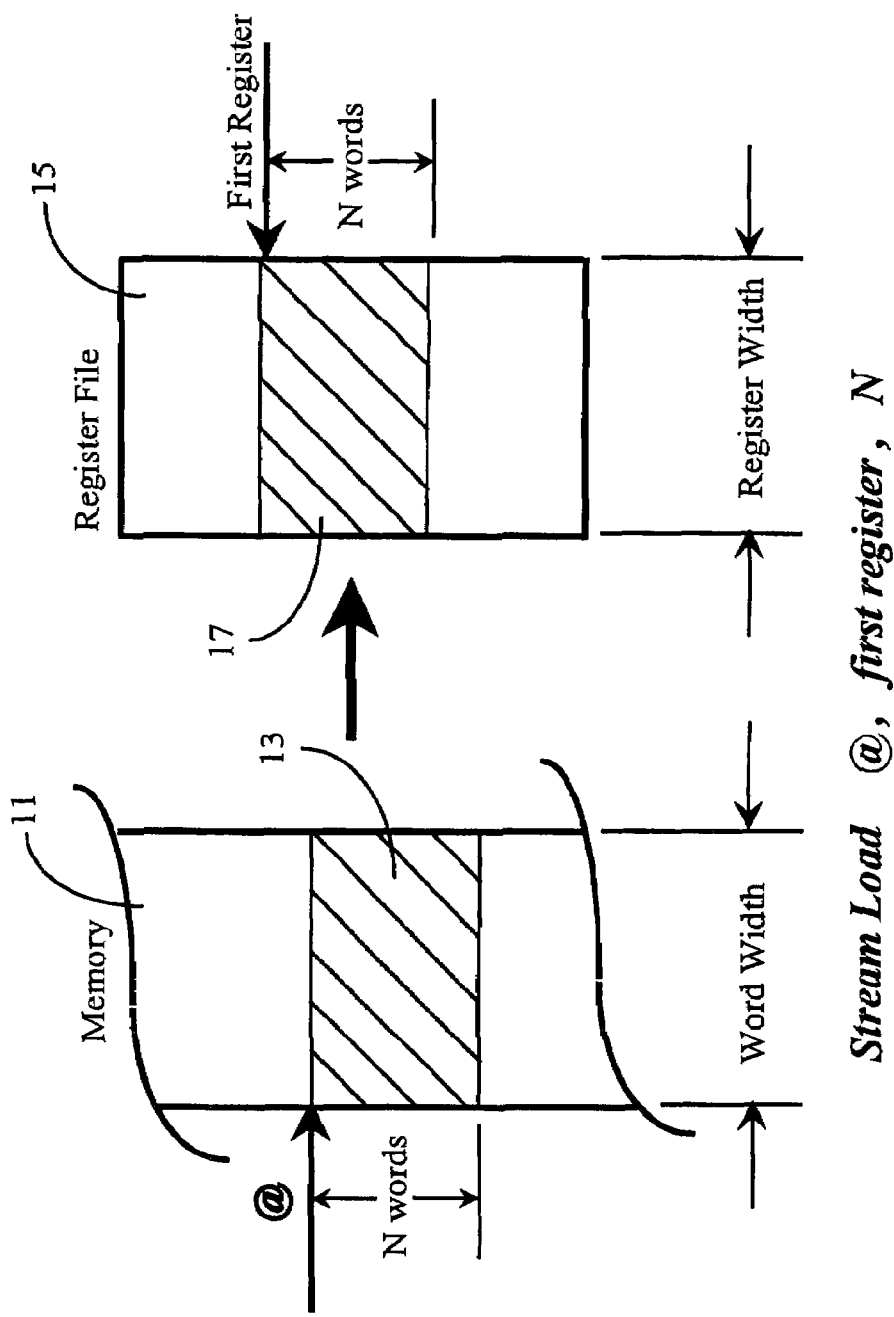
FIG. 1A is a schematic diagram of a memory and a register file illustrating a Stream Load operation according to an embodiment of the present invention.

FIG. 1A is a schematic diagram illustrating a memory 11, which may be any memory, such as a cache memory or a system memory from which a CPU may fetch data, and a register file 15. Memory 11 has a Word Width, which in a preferred embodiment is 32 bits, and register file 15 similarly has a register width. The word width and the register width are preferably the same, but may differ in different embodiments of the invention.

Below the schematic of memory and register file in FIG. 1 there is a logical structure for a Stream Load instruction according to an embodiment of the present invention. In the instruction structure there is an instruction opcode (for Stream Load), and three arguments, being a first argument @, a second argument "first register, and a third argument "N". Referring to the diagram, when the CPU executes this instruction, it knows from the instruction opcode what the order of operations is to be, taking words from memory 11 and writing these words into register file 15. The arguments provide the parameters.

In the example shown the CPU will read N consecutive words, beginning at address @ in memory 11, shown in FIG. 1A as words 13 in the shaded area, and will write those N words in the same order to register file 15, beginning at register "first register" providing in the register file the block of words 17.

In alternative embodiments of the invention, because the width of a word in memory may differ from the width of a register in the register file, words selected from memory may affect more than a single register, or may not fill a register. If the memory word, for example, is twice the register width, one memory word will fill two consecutive registers, and a selected number of memory words will fill twice that number of registers. On the other hand, if a memory word is one-half the register width it will take two memory words to fill a single register.

Figure 1B:
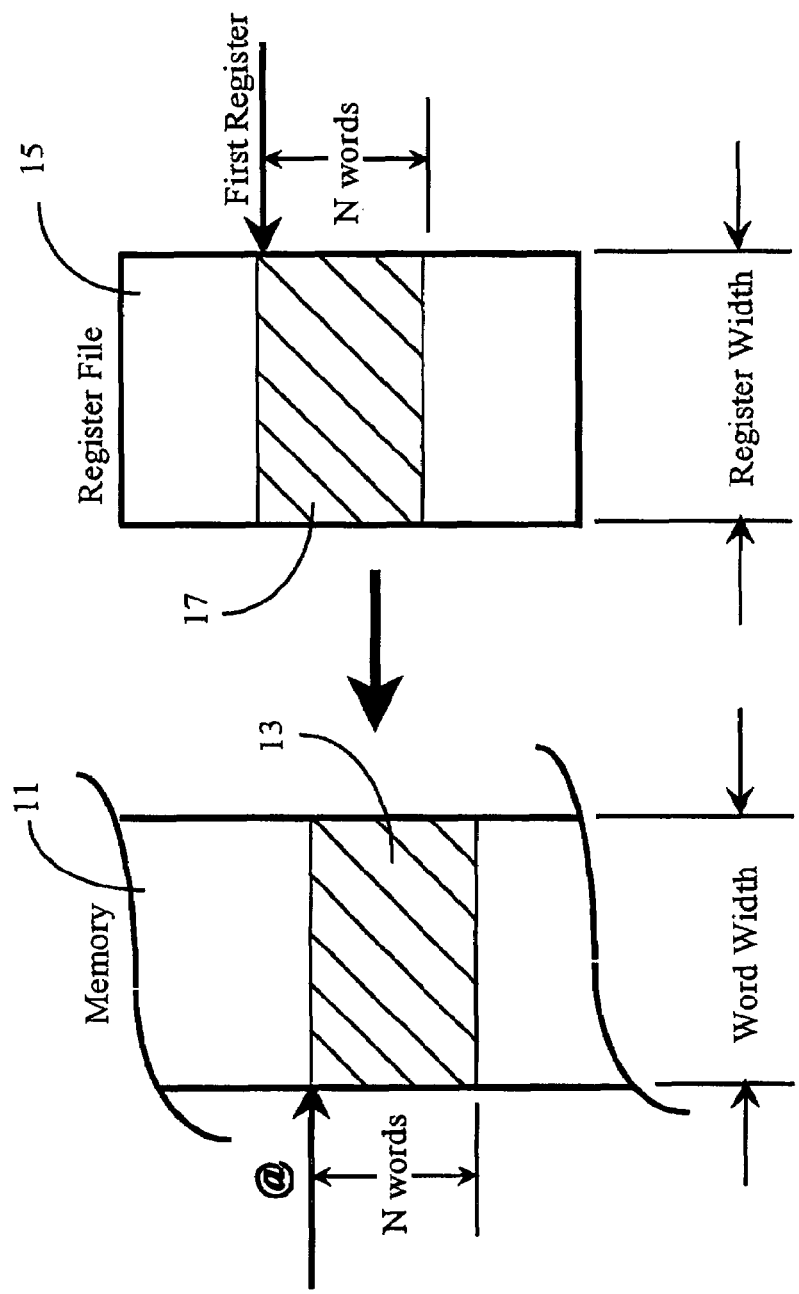
FIG. 1B is a schematic diagram of a memory and a register file illustrating a Stream Store operation according to an embodiment of the present invention.

FIG. 1B is a schematic diagram similar to FIG. 1A, but depicting a companion Stream Store instruction, wherein the CPU, executing the instruction, will read N consecutive words (words 17) from register file 15, beginning at register "first register", and will write those N words in the same order to memory 11 beginning at address @ defined in the arguments, providing words 13.

The new instructions defined herein have important application in several instances, one of which is in application of multi-streaming processors to processing packets in network packet routing. These instructions, however, will find many other uses in use of virtually any sort of processor in a wide range of applications.

In packet processing, many packets have identical structure, and it is necessary, once a packet is brought into a router and stored in a memory such as memory 11, to load certain header fields into a register file to be processed according to certain rules. As the structure is known, bytes that comprise the header may be stored in memory consecutively, the arguments of the new Stream Load and Stream Store instructions may be structured to load all of the necessary data for a packet to a register file for processing, and to store registers after processing. It may, of course, be the same or different registers that are stored as the registers that are used in Load. There are similarly many other potential applications for Stream Load and Stream Store, which will improve computer operations in many instances.

In an alternative embodiment of the present invention the inventors have determined the functionality of the invention may be significantly enhanced by structuring new commands to load and store multiple words without a limitation that the words be consecutive in either the memory or in the register file. The new commands are named Masked Load and Masked Store respectively.

FIG. 2A is a schematic diagram of memory 11 and register file 15 illustrating an example of Masked Load. Memory 11 in this example is 1 byte wide, and 8 memory words are shown in memory 11, arbitrarily numbered 0 through 7. Each word has a memory address as is known in the art. Register file 15 in this example is 4 bytes wide, and is shown organized into registers arbitrarily numbered on the left from 0 to 7. Below the schematic is an example of the organization of a Masked Load instruction, having three arguments. A first argument is an address in memory 11, the second argument is a first register in the register file, and the third argument is now a mask number.

Figures 2B, 2C:
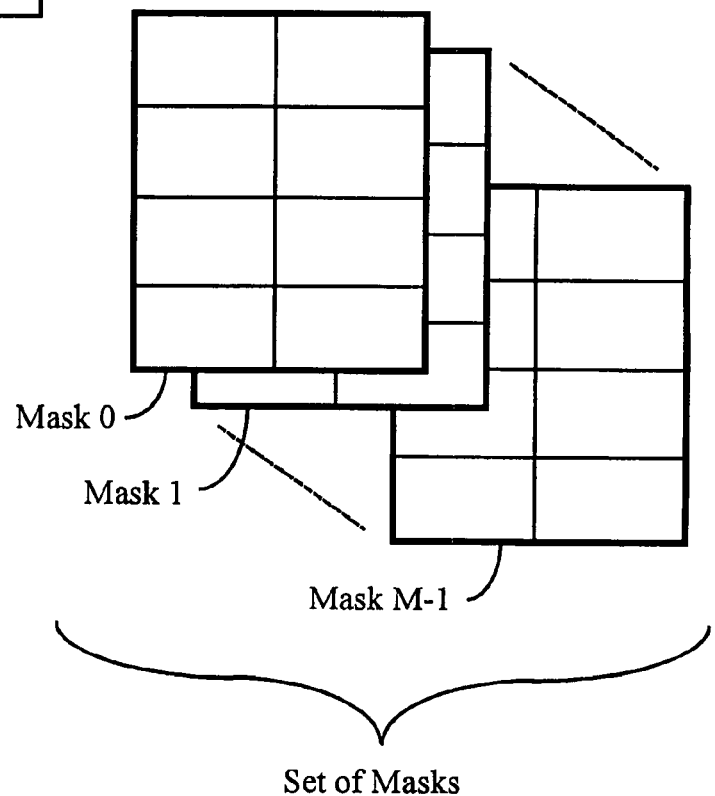
FIG. 2B illustrates an exemplary mask according to an embodiment of the present invention.
FIG. 2C illustrates a set of masks according to an embodiment of the present invention.

FIG. 2B illustrates a Mask example having two columns, the left-most column for memory byte number, as shown, and the right-most column for relative register number. This is the mask for the Masked Load example of FIG. 2A. Note that memory byte numbers 0, 3, 5, and 7 are listed in the left-most column, and relative register numbers 0, 0, 2, and 3 are listed in the right-most column. The mask tells the Masked Load instruction which memory bytes to read, and where to write these bytes into the register file.

Referring again to FIG. 2A, note that relative memory bytes 0, 3, 5, and 7 are shaded (each differently). The address (@) argument of the Masked Load instruction tells the CPU where to position the mask in memory, and the mask selects the bytes to read relative to the starting address. Since the register file is four bytes wide, four bytes from memory can be written side-by-side in a single register of the register file. In this example the default is that selected bytes will be written into the register file beginning in the least significant byte of each register, which is, by default, the right-most byte in this example.

The mask says that relative memory byte number 0 is to go to relative register number 0. This is the first register indicated by the second argument of the instruction. Memory byte 0 is thus shown as written to the least significant byte of relative register 0 in the register file. The mask indicates next that relative memory byte 3 is also to be written to relative register 0 of the register file. Since this is the second byte to go to relative register 0, it is written to the second to the second least significant byte in the indicated register of the register file. Memory byte 5 is written to relative register 2, and since it is the only byte to go to register 2, it goes in the 1.s. position. Relative memory byte 7 goes to relative register 3 according to the mask, and this is shown in FIG. 2A as well. The cross-hatching has been made common to illustrate the movement of data from the memory to the register file.

By default in this example data entities selected from memory are written to registers beginning at the least significant byte until a next entity is to be written to a different register. This is just one example of placement of selected bytes in registers. Any other placement may also be indicated by a mask, and the simple mask shown could have more columns indicating byte placement in registers. Many mask implementations and defaults are possible within the spirit and scope of the invention.

Just as illustrated above in the case of the Stream Load and Stream Store operations, the Masked Load operation has a matching Masked Store instruction as well. In the Store case, in the instruction architecture selected bits indicate the Store as opposed to Load operation, and the arguments have the same structure as for the Masked Load.

It will be apparent to the skilled artisan that the masks can be of arbitrary number in different embodiments of the invention, and the length of each mask, defining the number and position of bytes to be loaded, can vary in different embodiments as well. In one embodiment of the present invention the masks are useful in the situation discussed briefly above, that of processing data packets in routing machines. In this particular case the masks can be implemented to capture certain patterns of data entities from a memory, such as certain headers of packets for example, in processing data packets for routing.

Also in some embodiments of the present invention Masked Load and Masked Store instructions are used in threads (software) used for packet processing using dynamic multi-streaming processors. These processors have plural physical streams, each capable of supporting a separate thread, and each stream typically has a dedicated register file. In this case mask sets can be stored and dedicated to individual streams, or shared by two or more, or all streams. Such dynamic multi-streaming (DMS) processors are described in detail in the priority documents listed in the Cross-Reference to related documents above.

In a preferred embodiment masks are programmable, such that mask sets can be exchanged and amended as needed. Masks may be stored in a variety of ways. They may be stored and accessible from system memory for example, or in hidden registers on or off a processor, or in programmable ROM devices. In some embodiments facility is provided wherein masks may be linked, making larger masks, and providing an ability to amend masks without reprogramming. In one embodiment of the invention 32 masks are provided and up to 8 masks may be linked. In some cases masks may be stored in the instruction itself, if the instruction is of sufficient width to afford the bits needed for masking. If the instruction width is, for example, 64 bits, and only 32 bits are needed for the instruction itself, the other 32 bits may be a mask vector.

In the matter of programmability, masks may be programmed and/or amended in a variety of ways. Programming can be manual, in the sense of requiring human intervention, or amendable by dynamic action of the processing system using the masks. In the latter case, in application to DMS processors, there may be certain software burden, because, if one stream is using a mask or a set of masks in a load or store operation, it must be guaranteed that no other stream will update that mask or mask set. So in the case of DMS processors it is preferred that masks be dedicated to streams. In such a processor system, having k streams, there might be a mask or a set of masks dedicated to each of the k streams, such that a particular stream can only use and update its own mask or set of masks.

In the descriptions above, no particular distinction has been made to the memory source and destination of data entities for a Masked Load or a Masked Store operation. It is well known in the art, however, that state-of-the-art processors operate typically with cache memory rather than directly with system memory only. Cache memory and cache operations are notoriously well-known in the art, and need not be described in detail here.

In one embodiment of Masked Load and Store operations used with DMS processors according to the present invention, the masked load/stored could chose to bypass the cache (i.e. the access goes directly to the memory without consulting whether the required data resides in the cache), even if the memory access belongs to a cacheable space. Then, it is up to software to guarantee the coherency of the data. If the data cache is bypassed, the read/write ports to the data cache are freed for other accesses performed by the regular load/stores by other streams. Ports to caches are expensive.

Figure 3A:
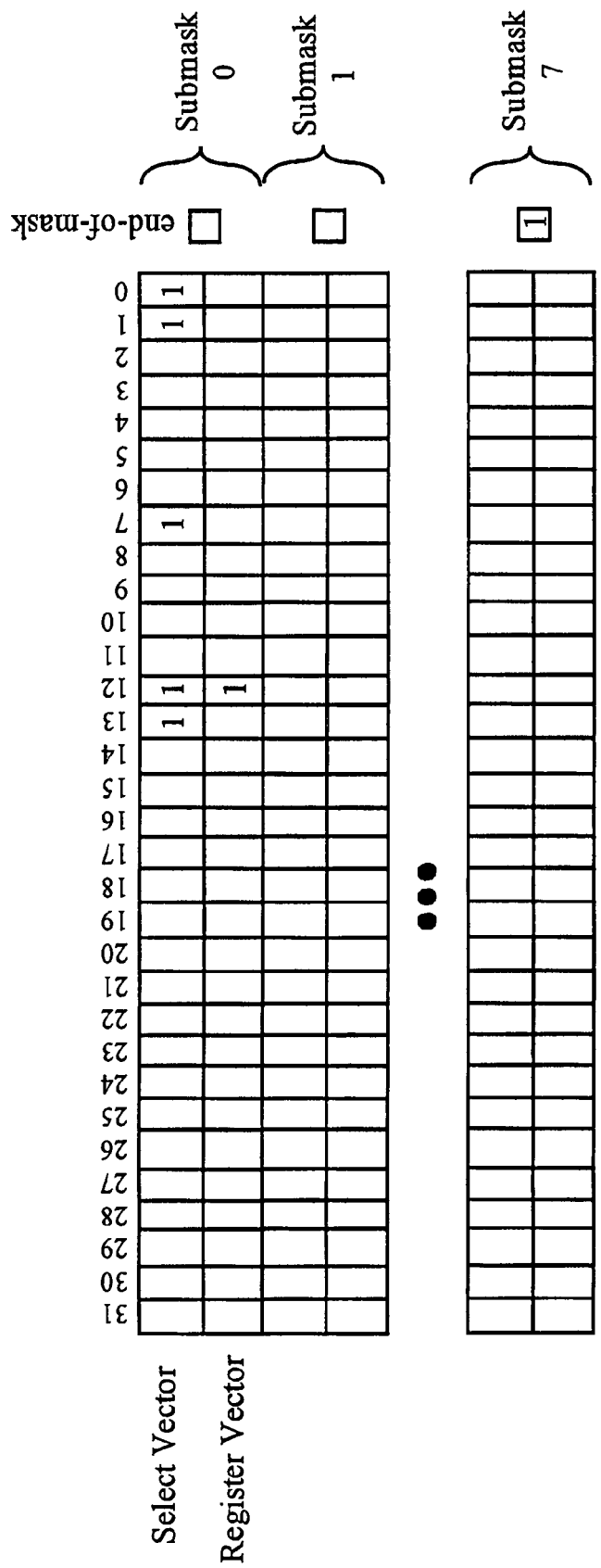
FIG. 3A illustrates a mask comprising submasks implemented as vectors according to an embodiment of the invention.

In a preferred embodiment of the invention masks (or in some cases parts of masks) are implemented as two vectors, each written and stored as a 32-bit word. FIG. 3A is an illustration of vector-masks, and FIG. 3B illustrates a memory 17 and a register file (context register) 19 wherein bytes from memory 17 are transferred into file 19 according to the vector-mask of FIG. 3A.

Referring now to FIG. 3A, in each submask there are two vectors, being a select vector and a register vector. A submask as illustrated in FIG. 3A may be a complete mask, and a complete mask may consist of up to eight (in this embodiment) submasks. This is described in more detail below.

Referring now to submask 0 in FIG. 3A, there are ones in bits 0, 1, 7, 12 and 13 in the Select vector. A one in any position in the select vector is to select a relative bit to be transferred from a memory to a register file. Other bits are zero. Of course the opposite could be true.

Figure 3B:
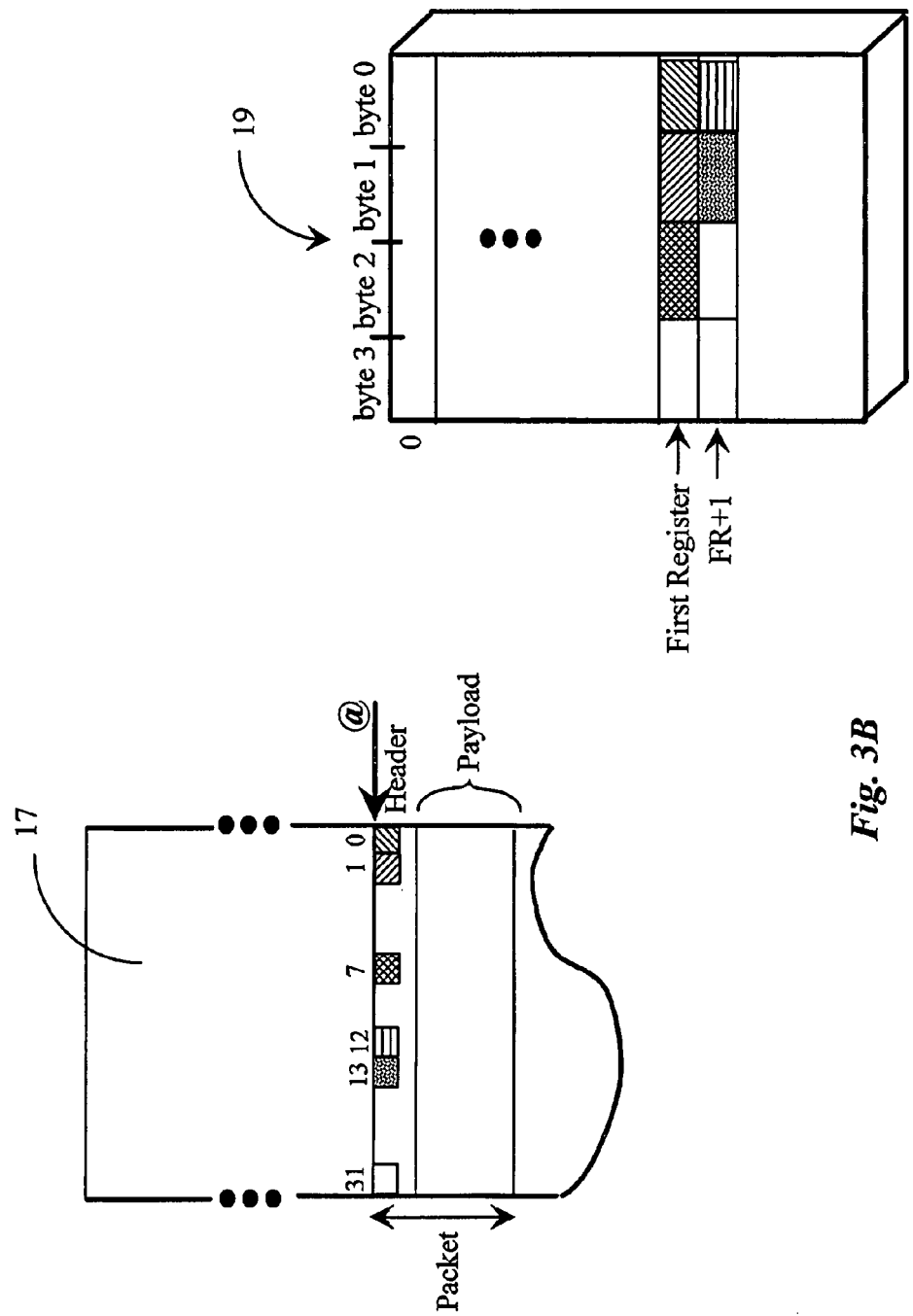
FIG. 3B illustrates a memory and a register file in masked operations according to an embodiment of the invention.

Referring now to FIG. 3B, memory 17 is organized as 32 bytes wide. In this example the application is packet processing, and the data entities manipulated are bytes from header fields for packets. As described before, the beginning position for selecting data entities is given in the Masked Load instruction as the first argument @ (for address, see FIG. 2A). The third argument provides the Mask number, which is, in this case the two-vector submask of FIG. 3A. The relevant bytes of the packet header stored in memory 17 and indicated as to-be-transferred by submask 0 of FIG. 3A are shown in memory 17 of FIG. 3B as shaded, each a different shading. This any combination or all of the bytes from the packet header of 32 bytes may be selected for transfer to a register file.

The Register vector of submask 0 indicates the relative position within the register file to write the selected bytes. Note there is a one in only one position in the Register vector in this particular example, that at position 12. The significance of the one in the register vector is to index the register wherein bytes are to be stored in the register file. There may in other examples be more than a single one in the register vector.

Referring now to FIG. 3B, bytes are stored in the register file beginning at a first register (FR). The first register for storage (start loading register) is the second argument of the Masked Load instruction. In other applications and embodiments there may be different defaults for different reasons. The Masked Load instruction in this example begins loading selected bytes from memory 17 into register file 19 at the first register and the default is to load in order from the least significant position, and adjacent, until the register is indexed by the register vector. Another order could well be used in another embodiment. Accordingly bytes 0, 1, and 7 are loaded into the first register from the right (1.s.). The one at position 12 in the Register vector of FIG. 3A indexes the register, so bytes 12 and 13 are loaded into the first two positions of register FR+1. As there are no more bytes from memory 17 selected, this is the end of the operation.

As described above and illustrated herein, submask 0 is a complete mask. In a preferred embodiment, however, up to eight submasks may be combined to make a mask. Each submask in this embodiment has an end-of-mask bit as indicated in FIG. 3B. A one in the end-of-mask bit indicates that submask is the last submask to be combined to form the mask for a particular instruction.

It is emphasized that the example of vector masks described just above is a single example. Many other masking schemes are possible within the spirit and scope of the invention. For example, selection and placement could be indicated by a single vector wherein a first data entity indicated to be selected beginning at a first address would be copied to a first register, and one or more zeros between data entities to be selected would indicate an index in the register in which following entities are to be placed in the register file. Many such schemes are possible, and a relatively few are indicated by example herein.

It will be apparent to the skilled artisan that, just as described above in the case of Stream Load and Store instructions, Masked Store may be accomplished in much the same fashion as the Masked Load instruction described in detail.

In the store operations of the example, note that there are bytes of the register file to which data entities are not written. There is a choice of whether to leave these bytes or to clear them. In a preferred embodiment the unused bytes are cleared.

It will be apparent to the skilled artisan that there are many variations that may be made in the embodiments of the present invention described above without departing from the spirit and scope of the invention. For example, there are a wide variety of ways that masks may be structured and implemented, and a wide variety of ways that masks may be stored, programmed, exchanged, and amended. There are similarly a variety of ways Masked Load and Store instructions may be defined and implemented, depending on the Instruction Set Architecture used. There are similarly many applications for such unique instructions beyond the packet-processing applications used as examples herein, and the new instructions may be useful with many kinds of processors, including Dynamic Multi-Streaming (DMS) Processors, which are a particular interest of the present inventors.

In the matter of DMS processors, the present application is related to four cases teaching aspects of DMS processors and their functioning, all four of which are listed in the Cross-Reference section above, and all four of which are incorporated into the present case by reference. the use of the stream and masked load/store instructions as taught above are especially interesting in DMS processors, since the stream that executes the new instructions in a thread can remain inactive while the masked load/store instruction is being executed in a functional unit. Therefore, other streams can make use of the rest of the resources of the processor. The stream executing the new instructions does not need to sit idle until the masked load/store completes, however. That stream can go on and execute more instructions, as long as the instructions do not depend on the values in the registers affected by the masked load/store instruction in execution. In other words, the stream could execute instructions out-of-order.

In addition to the above, there is a wide choice of granularity in different embodiments of the invention. In the example used, bytes are selected, but in other embodiments the granularity may be bits, words, or even blocks of memory. If words are used, there need not be a register vector, if the register is of the same word width. It should further be noted that the Stream Load and Store operations are simply a particular case of the Masked Load and Store operations.

Given the broad application of the invention and the broad scope, the invention should be limited only by the claims which follow.

What is claimed is:

1. In computer operation, a method for selecting data entities from a memory and writing the data entities to a register file, comprising steps of: (a) consulting a first map of entities to copy relative to a first address; (b) selecting and reading those entities indicated by the map; (c) consulting a second map of positions to write the entities copied from the memory, relative to a first register; and (d) writing the entities to the register file according to the second map wherein the first and second maps are implemented as bitstrings, wherein the position of bits in the string indicate the positions for data entities to be selected from memory, and the registers to which data entities are to be written and wherein bit string maps are expressed as submasks, and submasks are linkable in different combinations to provide combined masks.

2. The method of claim 1 wherein the steps follow from a Masked Load instruction implemented according to an instruction set architecture (ISA).

3. The method of claim 2 wherein the ISA is MIPS.

4. The method of claim 3 wherein arguments of the Masked Load instruction indicate a beginning memory address for positioning a mask, a mask number to be used, and a first register where to begin writing data entities in the register file.

5. The method of claim 2 wherein the execution of the Masked Load is performed in a Dynamic Multi-streaming (DMS) processor by a first stream running a first thread, and the first stream remains inactive while the Masked Load instruction is executed.

6. The method of claim 2 wherein the execution of the Masked Load is performed in a Dynamic Multi-streaming (DMS) processor by a first stream running a first thread, and the first stream executes instructions that do not depend on values in memory affected by the Masked Load instruction while the Masked Load instruction is executed.

7. In computer operation, a method for selecting data entities from a register file and writing the data entities to a memory, comprising steps of: (a) consulting a first map of entities to read relative to a first register; (b) selecting and reading those entities indicated by the map; (c) consulting a second map of positions to write the entities read from the register file, relative to a first address; and (d) writing the entities to the memory file according to the second map wherein the first and second maps are implemented as bit strings, wherein the position of bits in the string indicate the positions for data entities to be read, and the registers to which data entities are to be written and wherein bit string maps are expressed as submasks, and submasks are linkable in different combinations to provide combined masks.

8. The method of claim 7 wherein the steps follow from a Masked Store instruction implemented according to an instruction set architecture (ISA).

9. The method of claim 8 wherein the ISA is MIPS.

10. The method of claim 9 wherein arguments of the Masked Store instruction indicate a beginning register for positioning a mask, a number to be used, and a first register where to begin writing data entities in the memory.

11. The method of claim 8 wherein the execution of the Masked Store is performed in a Dynamic Multi-streaming (DMS) processor by a first stream running a first thread, and the first stream remains inactive while the Masked Store instruction is executed.

12. The method of claim 8 wherein the execution of the Masked Store is performed in a Dynamic Multi-streaming (DMS) processor by a first stream running a first thread, and the first stream executes instructions that do not depend on values in memory affected by the Masked Store instruction while the Masked Store instruction is executed.

* * * * *